United States Patent [19]

Tsujimoto et al.

[11] 3,882,511
[45] May 6, 1975

[54] ELECTRICAL EXPOSURE CONTROL DEVICE FOR A PHOTOGRAPHIC CAMERA

[75] Inventors: Kayoshi Tsujimoto; Toru Matsui, both of Osaka, Japan

[73] Assignee: Minolta Camera Kabushiki Kaisha, Osaka, Japan

[22] Filed: Aug. 8, 1973

[21] Appl. No.: 386,557

[30] Foreign Application Priority Data
Aug. 8, 1972  Japan .............................. 47-78791

[52] U.S. Cl. ...................... 354/29; 354/31; 354/38; 354/43; 354/51; 354/60 E
[51] Int. Cl. ............................................ G03b 7/08
[58] Field of Search ........... 95/10 C, 10 CE, 10 CT, 95/10 CE, 64 C; 354/29, 31, 38, 43, 51, 60 E

[56] References Cited
UNITED STATES PATENTS

| | | | |
|---|---|---|---|
| 3,503,313 | 3/1970 | Kuramoto | 95/10 CE |
| 3,593,629 | 7/1971 | Rentschler | 95/10 CE |
| 3,829,867 | 8/1974 | Ono | 354/29 |

*Primary Examiner*—Samuel S. Matthews
*Assistant Examiner*—Russell E. Adams, Jr.
*Attorney, Agent, or Firm*—Watson, Cole, Grindle & Watson

[57] ABSTRACT

In a photographic camera provided with an electrical exposure control switchable between a programmed exposure control and a shutter-speed-precedence exposure control by a selecting dial, either one of a first resistor is selected by the selecting dial to determine a shutter speed or a second resistor is selected by means of the deflection angle of an ammeter pointer incorporated in a light measuring circuit containing a photoelectric element and constitutes part of a timing circuit for controlling shutter closing. The light measuring circuit comprises two different γ compensating circuits, respectively associated with the programmed exposure control and the shutter-speed-precedence exposure control by means of the selecting dial to compensate for the gradients of resistor-luminance characteristic lines of the photoelectric element. A diaphragm mechanism adjusts the luminance incident on the photoelectric element in accordance with the film sensitivity and shutter speed settings for shutter-speed-precedence exposure control operation and in accordance with a pre-set position of the selecting dial and the film sensitivity for programmed exposure control. The deflection angle of the ammeter may also be used to adjust the diaphragm aperture of an objective lens.

9 Claims, 10 Drawing Figures

ELECTRICAL EXPOSURE CONTROL DEVICE FOR A PHOTOGRAPHIC CAMERA

BACKGROUND OF THE INVENTION

This invention relates to an electrical exposure control device for use in a photographic camera which permits switchover between programmed exposure control and automatic exposure control by means of a diaphragm control with precedence given to the shutter speed.

Both automatic exposure control by means of control of the diaphragm with precedence given to the shutter speed and programmed exposure control are known, each type of exposure control having its respective advantages and disadvantages. Accordingly, an exposure control device for a camera, which permits switchover between such two types of automatic exposure control systems, may utilize the advantageous features of both the systems depending on the photographing conditions, and thus such a type of exposure control device is undoubtedly preferable.

There are known photographic cameras whose exposure is controlled mechanically, and in which the aforesiad two types of automatic exposure control systems are switched over from one to the other by means of a shutter mechanism or a mechanism cooperative with an ammeter pointer and in which the γ value of a photoelectric element is also compensated at the same time. However, because the shutter is controlled mechanically, there are a great number of mechanical components, thus providing a complex mechanism, which tends to cause difficulties.

OBJECTS OF THE INVENTION

Accordingly, it is an object of the invention to provide an electrical exposure control device for use in a photographic camera which is adapted to select between programmed automatic exposure control and shutter-speed-precedence exposure control and which avoids the aforesaid disadvantages.

It is another object of the invention to provide an electrical exposure control device for use in a photographic camera, which permits novel selection between programmed automatic exposure control and shutter-speed-precedence exposure control, and which further obviates the use of mechanical components for this purpose thereby simplifying the construction of the camera and decreasing the use of movable members.

It is a further object of the invention to provide an electrical exposure control device for use in a photographic camera, which is provided with means for easily switching a γ value photoelectric element compensating circuit into the exposure control device with switchover between programmed exposure control and shutter-speed-precedence exposure control by using a selecting member.

It is a still further object of the invention to provide an electrical exposure control device for use in a photographic camera, in the case where programmed exposure control is selected by means of a selecting member, having means for changing the resistance of a timing circuit, commensurate with the deflection angle of an ammeter pointer incorporated in a light measuring circuit, whereby shutter speed may be controlled.

It is a yet further object of the invention to provide an electrical exposure control device for use in a photographic camera of the type, in which either programmed exposure control or shutter-speed-precedence exposure control is selected by means of a selecting member, the camera being provided with means for supplying film sensitivity information to a light measuring circuit in addition to means for supplying shutter speed information; and in the case where shutter-speed-precedence exposure control is selected, a diaphragm may be electrically controlled commensurate with the brightness of a photographic object, the shutter speed, and the film sensitivity.

SUMMARY OF THE INVENTION

According to the present invention, there is provided an electrical exposure control device for use in a photographic camera of the type which permits selection of either programmed exposure control or shutter-speed-precedence exposure control. The exposure control device incorporates a first resistor adapted to determine shutter speed for the shutter-speed-precedence exposure control selected by a selecting member and a second resistor adapted to determine shutter speed for the programmed exposure control in accordance with the deflection angle of an ammeter pointer included in a light measuring circuit having a photoelectric element. Either one of the two aforesaid resistors is connected to a timing circuit depending on the selection of either programmed exposure control or shutter-speed-precedence exposure control by means of a selecting member. Thus, the gradients of the resistance-luminance characteristic lines of the photoelectric element may be switched from one to another.

According to another aspect of the present invention, there is provided an electrical exposure control device for use in a photographic camera of the type previously specified featuring that, in the case where programmed automatic exposure control is selected, a deflection angle of an ammeter pointer is determined, commensurate with the luminance of an object and film sensitivity setting, by means of a light measuring circuit including a photoelectric element. Thereby, a detecting member for detecting the deflection angle thus obtained controls the timeconstant resistance of a timing circuit included in any known exposure time control circuit, while the detecting member controls the size of a diaphragm aperture. Further, in the case where shutter-speed-precedence exposure control is selected, the aforesaid time-constant resistance is set in conjunction with a shutter speed dial, while the luminance-resistance characteristic of the light measuring circuit including the aforesaid photoelectric element is varied. The detecting member adapted to detect the deflection of any ammeter pointer may control the size of a diaphragm aperture, such that switchover between both the exposure controls may be effected merely by the switching of a switch. The above described structure and operation permits the use of common components, thus materially simplifying the construction and eliminating the mechanical factors which are the cause of difficulties.

DESCRIPTION OF THE PREFERRED EMBODIMENTS

Figure 1:
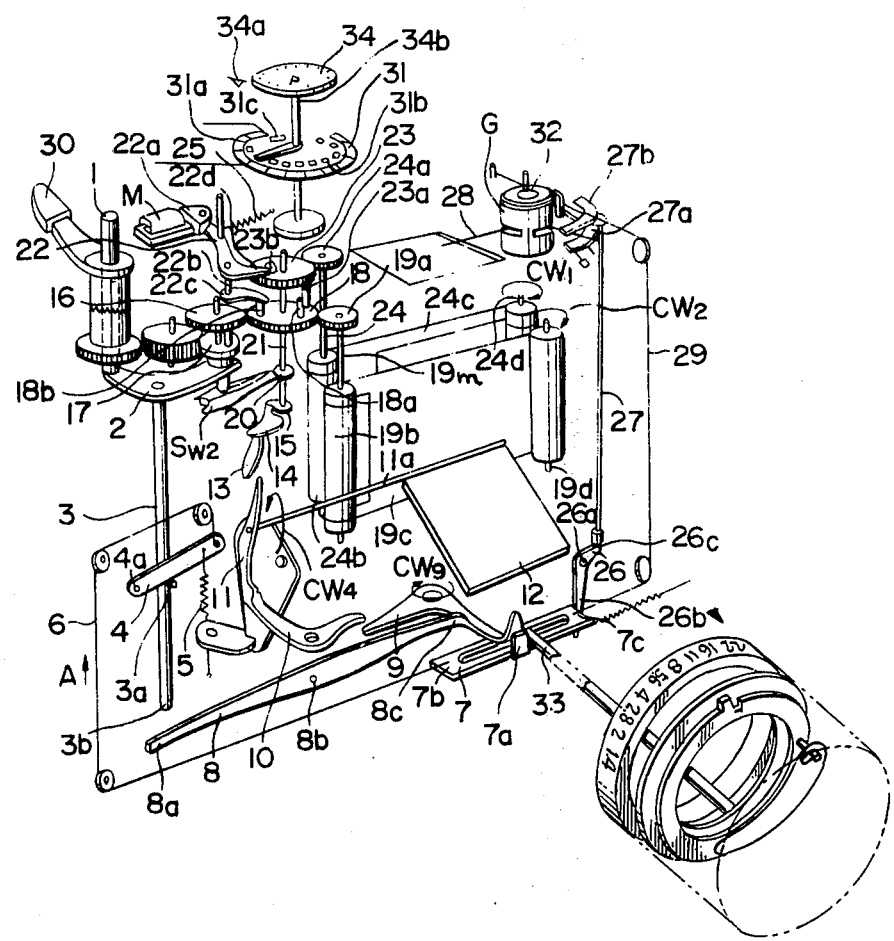
FIG. 1 is a perspective view of a camera showing the essential parts of one embodiment of the present invention, excluding those parts associated with a shutter speed setting dial, an adjusting mechanism for the quantity of light received, as well as a film sensitivity setting member.

Referring now to FIG. 1, shutter button 1 is loosely fitted within an axial bore portion of winding lever 30, and interlocking lever 2 adapted to cooperate with shutter button 1 interrupts the clutch connection between winding gears 16 and 17. Interlocking rod 3, extending from interlocking lever 2, is formed with integral projection 3a, which engages diaphragm operating lever 4 having a rotating tendency in a clockwise direction produced by spring 5. Shaft hole 4a of lever 4 is journaled in the camera body (not shown). One end of cable 6 is attached to one end of diaphragm operating lever 4 with the other end of the cable connected to one end 7b of diaphragm operating member 7 which is mounted to reciprocate with respect to the camera body.

Diaphragm operating member 7 is provided with projection 7a engageable with objective lens diaphragm adjusting member 33. The other end 7c of diaphragm operating member 7 is in engagement with arm 26b of L-shaped connecting rod 26, shaft 26a thereof is journaled in the camera body and arm 26c is in engagement with connecting rod 27.

Pointer holding plate 27b is mounted to the uppermost end of connecting rod 27 to face counter plate 27a. One pointer 28a of two pointers 28a and 28b extending radially from the rotating axis of ammeter G indicates a diaphragm aperture corresponding to the rotation angles of said rotating axis and the other pointer 28b is rotatable within the angle shown by α in FIG. 2 between pointer holding plate 27b and counter plate 27c.

Therefore, when shutter button 1 is pushed down and operating lever 4 is turned clockwise by projection 3a of interlocking rod 3 and spring 5, cable 6 is pulled to the direction shown by arrow A, and when diaphragm operating member 7 is moved to the left in FIG. 1, L shape connecting rod 26 is turned counterclockwise to descend pointer holding plate 27b by means of connecting rod 27 and pointer holding plate 27b is pressed to contact with counter plate 27a having pointer 28b interposed therebetween so as to hold pointer 28b rotating within said angle α in its position depending on a photometric measurement. One end of cable 29 is affixed to end 7c of diaphragm operating member 7 and the other cable end is connected to L-shaped detecting lever 32 pivotally mounted on ammeter G. Detecting lever 32 having a tendency to rotate counterclockwise through weak spring 32d is rotatable within the rotating path of pointer 28b and its rest position resides in the position shown in FIG. 2 where it rotates counterclockwise beyond said rotation angle α of pointer 28b.

Therefore, as described above after shutter button 1 is pushed down and diaphragm operating member 7 is moved to the left in FIG. 1 by strong spring 5, pointer 28b is held by pointer holding plate 27b, detecting lever 32 is rotated clockwise by cable 29 against spring 32d to engage with pointer 28b in its restrained position. That is to say, the descent of pointer holding plate 27b and the clockwise rotation of detecting lever 32 are simultaneously started but the rest position of detecting lever 32 resides outside angle α in the opposite direction, so that after pointer 28b is first held by holding plate 27b, detecting lever 32 can detect the position of restrained pointer 28b.

Figure 2:
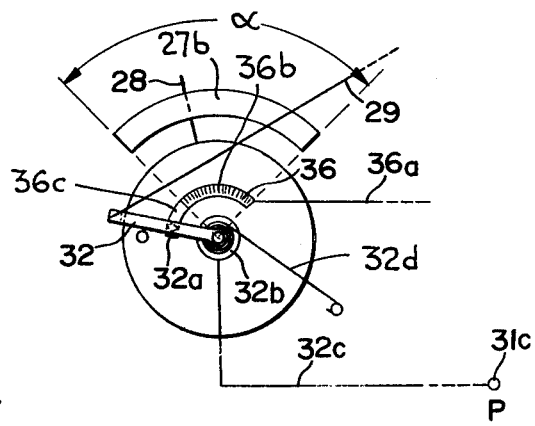
FIG. 2 is a plan view showing an ammeter and a detecting member as well as a variable resistor controlled by the detecting member as used in the embodiment of FIG. 1.

As shown in FIG. 2, detecting lever 32 is formed with projecting brush 32a such that, as detecting lever 32 rotates about shaft 32b until it abuts with pointer 28, brush 32a slides on resistor 36 mounted on ammeter G. Resistor 36 is provided with resistance sphere 36b in the angular position corresponding the angular rotation to α of pointer 28b and conductive sphere 36c connected with resistance sphere 36b in the counterclockwise side therefrom and extending over the rest position of detecting lever 32 shown in FIG. 2. Detecting lever 32 and shaft 32b are made of an electrically conductive material. Lead line 36a is connected to the right end of resistance 36b of resistor 36 and lead line 32c is connected to shaft 32b. With this arrangement, the resistance between lead lines 36a and 32c is the resistance between the position of brush 32a and the right end of resistance 36b of resistor 36. This resistance determines the shutter speed for the programmed exposure control which will be described in detail hereinafter.

Again with reference to FIG. 1, located under lower end 3b of interconnecting rod 3 is arm 8a of lever 8, and when interconnecting rod 3 is lowered, end 3b will cause lever 8 to rotate about pivot 8b in a counterclockwise direction. Arm 8c of lever 8 engages lever 9, having a tendency to rotate in the direction shown by arrow CW9 due to the force of a spring (not shown) to thereby arrest lever 9 from being rotated. When the aforesaid arresting condition is released through the rotation of lever 8, then lever 9 releases mirror lever 10, so that shaft 11a rotates in the direction shown by arrow CW4 by the force of a spring (not shown). Mounted to shaft 11a is movable mirror 12. Forward curtain arresting lever 14 is operated by means of the rotation of mirror 11 into engagement with lever 13.

Forward curtain arresting cam 15 and projection 20 are journaled on curtain operating shaft 21 and cam 15 is engageable with forward curtain arresting lever 14 and projection 20 and tends to open and close trigger switch SW2. Switch SW2 is closed when the shutter is cocked. Forward curtain gear 18 is also fixedly journaled to forward curtain operating shaft 21 and meshes with winding gear 16. Forward curtain gear 18 also meshes with forward curtain winding gear 19a, fixedly journaled on forward curtain shaft 19m. Respective opposite end portions of forward curtain 19c are wound around drum 19b and on a winding drum on winding shaft 19d which has a tendency to rotate in the direction shown by arrow CW2. Rear curtain gear 23 is rotatably mounted to curtain operating shaft 21 and meshes with rear curtain winding gear 24a fixedly journaled on rear curtain shaft 24. The respective opposite end portions of rear curtain 24c are wound on drum 24b and on a winding drum mounted on shaft 24d which has a tendency to rotate in the direction shown by arrow CW1.

Forward curtain gear 18 has two upwardly extending pins 18a and 18b, each mounted thereon diametrically opposite one another. Pins 23a and 23b respectively extend downwardly and upwardly from opposite surfaces of rear curtain gear 23. Pins 23a and 23b are respectively adapted to engage pin 18a and pawl 22d in the course of shutter cocking as well as at the completion thereof. Rear curtain arresting lever 22, journaled fixedly on shaft 22b is rotatable relative to the camera body, is given a rotating tendency in the clockwise direction, with one arm thereof provided with pawl 22d engageable with pin 23b and with the other arm provided with armature 22a of electromagnet M. Lever arm 22c is mounted to shaft 22b and is rotatable in a direction opposing the force of spring 25 by its engagement with pin 18b, upon completion of the cocking of forward curtain gear 18.

Figure 3:
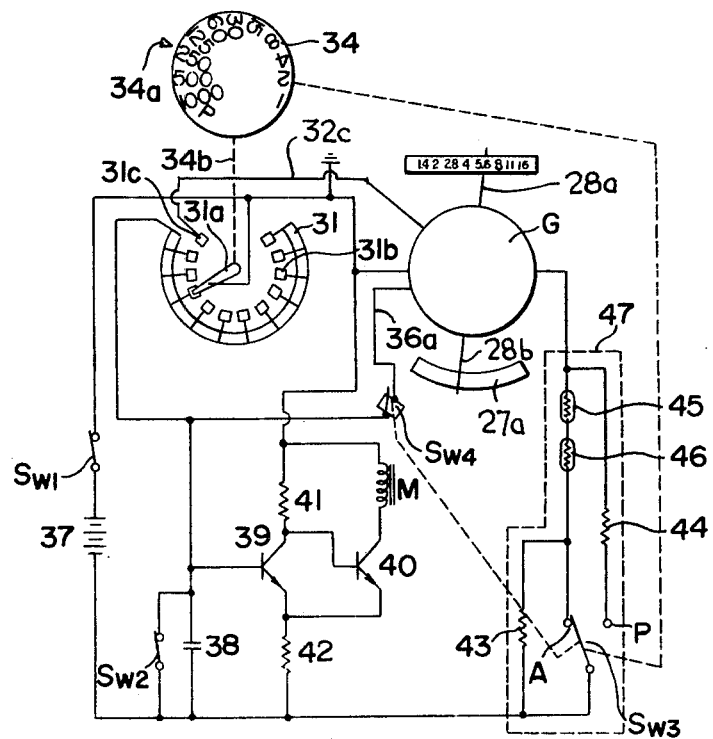
FIG. 3 is a wiring diagram of a light measuring circuit and an electrical control circuit as used in the embodiment of FIG. 2.

With reference to FIG. 3, which shows the exposure control circuit of the present invention, shutter dial 34 is a selecting member of effect the switchover between programmed automatic exposure control and shutter-speed-precedence automatic exposure control and has a graduation which indicates shutter setting speed as well as a programmed control position p which are to be aligned with index 34a. Rotary contact 31a, journaled on shaft 34b in integral relation with dial 34 is adapted to rotatably slide on a plurality of contacts 31b connected to resistor 31 as well as on contact 31c separated from resistor 31 and corresponding to point p.

With continuing reference to FIG. 3, the light measuring circuit consists of: electric power source 37; electric power source switch SW1; resistor 36 is adapted to be set by means of detecting lever 32 (FIGS. 1 and 2) and controlled by means of meter G; and γ compensating circuit 47 enclosed within the chain line and including photoelectric elements 45 and 46.

γ compensating circuit 47, for photoelectric elements 45 and 46, which may be, for example Cds, etc. type photoelectric elements, consists of switch SW3 for switching between programmed exposure control and shutter-speed-precedence exposure control and resistors 43 and 44 to compensate for the following variation upon switchover.

Switch SW3 is ganged with shutter speed dial 34 when it is aligned with contact p for programmed automatic exposure control and includes contacts A and P. The reason for this is that for programmed automatic exposure control, both the shutter speed and the diaphragm aperture will vary by one step, respectively, for variations in the brightness of a photographic object, whereas, for shutter-speed-precedence exposure control the shutter speed will be preset, while only the diaphragm varies. Accordingly, photoelectric elements 45 and 46 are connected in series with ammeter G by contact A. Whereas, when switch SW3 is connected to contact P, resistor 43 is connected in series with photoelectric elements 45 and 46, and resistor 44 is connected in parallel across the series connected photoelectric elements 45, 46 and resistor 43, whereby the apparent value of γ of photographic elements 45 and 46 may be converted for compensation. Also, two photoelectric elements 45 and 46 are used in this embodiment for the purpose of split-measurement of the screen, and they are disposed on a pentaprism γwill be described hereinafter. However, it is apparent that only one photoelectric element may be used instead.

Following is a description of the time constant circuit. For programmed automatic exposure operation, as has been described above, rotary contact 31a is so designed as to be positioned on contact 31c, which is separated from resistor 31, such that at that time resistor 36 is connected via switch SW4, ganged with switch SW3, in series to capacitor 38. The resistance of resistor 36 is selected by sliding contact 32a of detecting lever 32. However, the total resistance in the time constant circuit is determined by the position of both switches SW3 and Sw4. Switch SW4 is ganged with switch SW3 of α compensation circuit 47 and is closed when switch SW3 is brought in contact with contact P thereof and is opened when in contact with contact A. Capacitor 38 is connected in parallel with trigger switch SW2 which is opened upon the rotation of curtain operating shaft 21, i.e., the movement of forward curtain 19c, as shown in FIG. 1. When switch SW2 is opened, capacitor 38 commences to be charged to a given voltage, whereupon the electric current flowing through electromagnet M will be switched off via transistors 39 and 40. Accordingly, rear curtain arresting lever 22 as shown in FIG. 1 will be rotated by the force of spring 25 in a clockwise direction, whereupon rear curtain gear 23 is rotated, thus commencing movement of rear curtain 24c.

In contradistinction thereto, for the shutter-speed-precedence exposure control operation, shutter speed dial 34 is set to a required shutter speed, rotary contact 31a is connected to the corresponding contacts 31b. Switch SW3 of γ compensating circuit 47 is connected to contact A as shown in FIG. 3, whereby the deflection angle of the ammeter pointer, corresponding to the brightness of a photographic object, is indicated on the ammeter G. Accordingly, detecting lever 32 will detect the deflected position of pointer 28 to thereby control the diaphragm. In this respect, switch SW4 is on contact A and in the open position. Therefore, resistor 36, the resistance between lead line 36a and sliding terminal 32a is not connected to capacitor 38. Further, the timing constant circuit is governed by the resistance of resistor 31 which is determined by that terminal 31b which is connected to rotary contact 31a. The operations of the forward and rear shutter curtains are the same as those for programmed automatic exposure operation.

Furthermore, for programmed automatic exposure control operation the film sensitivity setting is fed to ammeter G. Moreover, for shutter-speed-precedence exposure control operation, the film sensitivity and the shutter speed settings are fed to ammeter G, whereby the diaphragm is automatically controlled according to the brightness of a photographic object.

Figure 4:
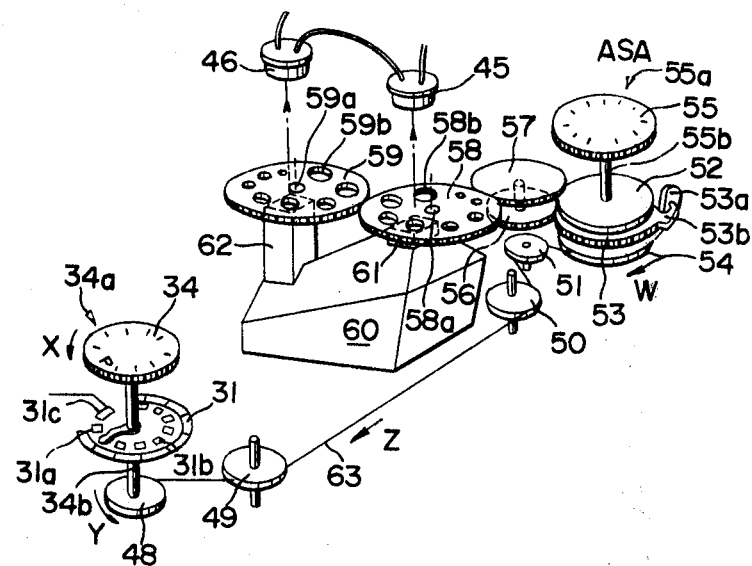
FIG. 4 is a perspective view showing the relationship of a shutter speed dial and a film sensitivity setting member for adjusting the quantity of light received by the photoelectric elements.

More specifically, the construction shown in FIG. 4 connects shutter speed dial 34, film sensitivity setting dial (not shown) and photographic elements 45 and 46. Briefly, pulley 48 is fixedly journaled on shaft 34b mounted fixedly to shutter speed dial 34. Pulley 52 is fixedly journaled in a spaced relation on shaft 55b on which is also loosely journaled another pulley 54 in spaced relation to pulley 52. Shaft 55b fixedly mounts film sensitivity setting dial 55 thereon, with disc 53, having gears along its circumference, loosely interposed between the two pulleys 52 and 54. Loosely fitted on shaft 53b, on which is fixedly journaled disc 53, is an epicyclic pulley 53a, with disc 53 being urged by a spring (not shown) in a direction reverse to that shown by arrow W. Both shafts 34b and 55b are arrested by means of a click mechanism so as not to be inadvertently moved. Cable 63, one end of which is secured to pulley 48, is trained via pulleys 49, 50 and 51 around pulley 54, with the other end being secured via epicyclic pulley 53a to pulley 52.

Accordingly, when film sensitivity setting dial 55 is rotated relative to fixed index 55a, then disc 53 will be rotated in the same direction as that of dial 55. When shutter speed setting dial 34 is rotated in the direction shown by arrow X, then pulley 48 will be rotated in the direction shown by arrow Y, while disc 53 will be rotated in the direction shown by arrow W.

Photoelectric elements 45 and 46 are mounted via small-sized prisms 61 and 62 on pentaprism 60. Iris discs 58 and 59, having a plurality of diaphragm apertures 58b and 59b therein and gears around their respective circumferences, are journaled rotatably on shafts 58a and 59a between small-sized prisms 61, 62 and photoelectric elements 45, 46.

Intermediate gear 56 meshes with the gears of disc 53 and is coaxial with gear 57 which meshes with iris disc 58, while the gears of both iris discs 58 and 59 are meshed with each other. Accordingly, as disc 53 rotates, both iris discs 58 and 59 will rotate, such that diaphragm apertures 58b and 59b having the same diameter define the diaphragm aperture for photoelectric elements 45 and 46.

Accordingly, when film sensitivity setting dial 55 is set, shutter speed setting dial 34 is then rotated and, when the shutter speed is lowered by one step, the diaphragm aperture provided to photoelectric elements 45 and 46 will be enlarged accordingly, such that the deflection angle of ammeter pointer 28 is thereby increased, thus enhancing the iris action of the lens.

Iris discs 58 and 59 may be an iris device having an aperture of varying size, or may be a filter or a light wedge or otherwise may be one which permits a variation in the quantity of the light from a photographic object incident on photoelectric elements 45 and 46.

Figure 5:
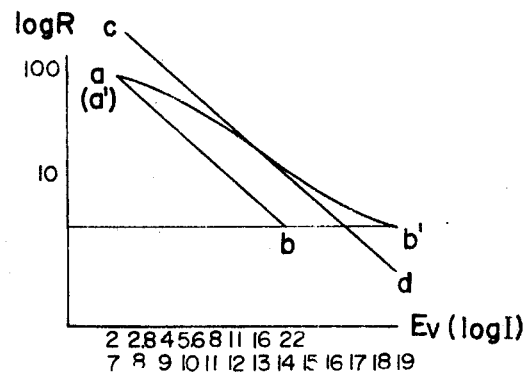
FIG. 5 is a plot showing the variation in the sensitivity characteristics of a photoelectric element as used in the embodiment of FIG. 4 with a γ compensation circuit illustrated in FIG. 3.

FIG. 5 shows an Ev-Log R characteristic curve of the α compensating circuit shown in FIG. 3. Line $ab$ represents the characteristic curve with photoelectric elements 45 and 46 connected in series by switch SW3 on contact A. Curve $a'b'$ represents the characteristic curve with switch SW3 on contact P. More particularly, the luminance on the light receiving surfaces of light receiving elements 45 and 46 is lowered so as to provide a characteristic line $cd$ by using iris plates 58 and 59. Further, resistors 43 and 44 are so selected as to maintain the relationship $a=a'$, whereby a wide range of the characteristic having a smaller γ value may be obtained.

Figure 6:
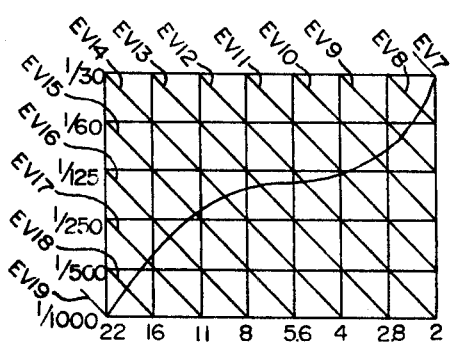
FIG. 6 is a program diagram of the characteristics of FIG. 5.

FIG. 6 is a program diagram of the characteristics of FIG. 5, with the diaphragm aperture represented on the abscissa and the shutter speed on the ordinate.

Figure 7:
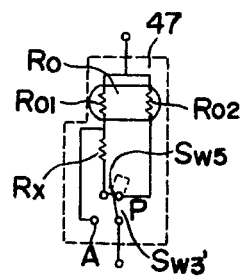
FIG. 7 is a wiring diagram of another embodiment using a composite photoelectric element.

FIG. 7 shows another embodiment of a γ compensating circuit, composed of light receiving element RO having two photoelectric elements RO1 and RO2 and provided with switch SW5 ganged with switch SW'3, which is switched between contact A and contact P. Switch SW5 is connected to contact P and resistor Rx. Thus, when switch SW'3 is on contact A for shutter-speed-precedence exposure control operation, the light receiving circuit will be constituted only by photoelectric element RO1. In contrast thereto, when switch SW'3 is on contact P for programmed exposure control operation, then the light receiving circuit will be constituted by photoelectric element RO2 being connected to the series circuit of high sensitivity photoelectric element RO1 and resistor Rx.

Figure 8:
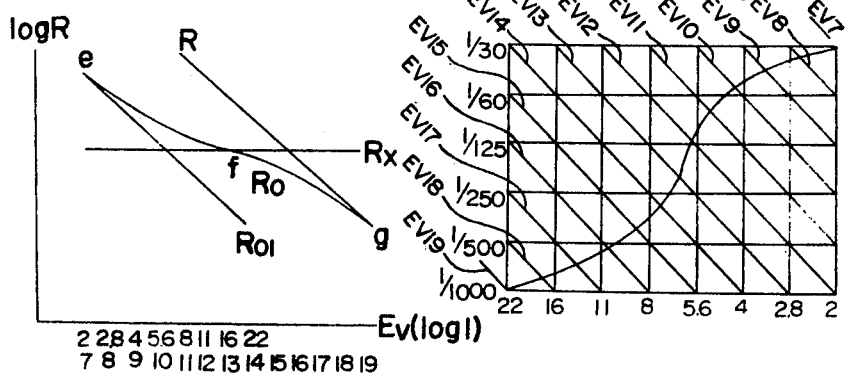
FIG. 8 is a plot showing the variation in the sensitivity characteristics of a photoelectric element with a compensating circuit as used in the embodiment of FIG. 7.

FIG. 8 shows the Ev-Log R characteristic of the aforesaid light receiving circuit. Like the previous case, when the switch SW'3 is on contact P, the γ value will be smaller with an accompanying wide range of characteristics.

Figure 9:
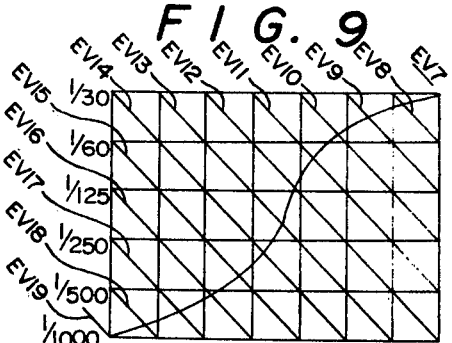
FIG. 9 is a program diagram of the characteristics of FIG. 8.

FIG. 9 is a program of the characteristics of FIG. 8, with the diaphragm aperture and the shutter speed respectively represented on the abscissa and the ordinate.

Figure 10:
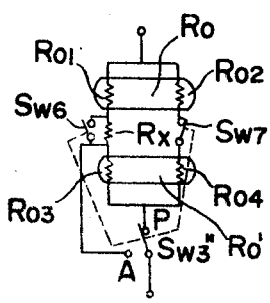
FIG. 10 is a wiring diagram of a still further embodiment of a light measuring circuit using two photoelectric elements.

FIG. 10 shows an embodiment of a circuit which enables split light measurement, and comprises two light receiving elements RO, R'O each having two photoelectric elements RO1, RO2 and RO3, RO4, respectively. Fixed resistor Rx is connected in series between high sensitivity photoelectric elements RO1 and RO3, and lower sensitivity photoelectric elements RO2 and RO4 are connected in parallel thereto but in series with each other. In this embodiment, there are provided switches SW6 and SW7 ganged with switch SW''3 which is switched between contact A for shutter-speed-precedence exposure control operation and contact P for programmed exposure control operation. With switch SW''3 on contact A, then switch SW6 is closed, while switch SW7 is opened. Thus, when contact A is connected, then the light receiving circuit is constituted by high sensitivity photoelectric element RO1. When contact P is connected, then the light receiving circuit is constituted by a circuit in which resistor Rx is connected in series to high sensitivity photoelectric element RO1 and RO3 as well as to both low sensitivity photoelectric elements R02 and RO4 connected in series with each other.

What is claimed is:

1. An electrical exposure control device for use in a photographic camera, comprising:
    a light receiving circuit including at least one light receiving element for generating a photometric output in accordance with the luminance on the light receptive surface thereof;
    objective lens diaphragm adjusting means for setting the camera lens aperture;
    a selecting member for selecting a first and a second exposure control, said first exposure control setting the camera shutter speed and adjusting said diaphragm means commensurate with said shutter speed setting and said photometric output, said second exposure control adjusting shutter speed and said diaphragm means in programmed relation commensurate with said photometric output;

a first variable resistor whose resistance varies in accordance with said selected shutter speed with said selecting member selecting said first exposure control;

a movable member responsive to said photometric output;

a detecting member for detecting the position of said movable member;

a diaphragm operating member responsive to said detecting member for controlling said objective lens diaphragm means;

a second variable resistor whose resistance is varied by said detecting member in accordance with the detected position of said movable member;

a timing circuit having a variable time constant for controlling the shutter speed, said time constant varying in accordance with said first variable resistor and said second variable resistor with said selecting member respectively selecting said first and said second exposure control;

means for switching said first variable resistor and said second variable resistor into said timing circuit in dependence upon the selection of said first and second exposure controls; and means for varying the ratio of said photometric output to the quantity of light incident on said light receiving element and providing a greater ratio with said selecting member selecting said first exposure control than with said second exposure control.

2. An electrical exposure control device as in claim 1, wherein said means for varying the ratio comprises: a first light measuring circuit including said at least one first light receiving element; a second light measuring circuit whose photometric output ratio is smaller than the photometric output ratio of said first light measuring circuit; and first means for switching between said first light measuring circuit and said second light measuring circuit.

3. An electrical exposure control device as in claim 2, wherein said second light measuring circuit includes at least one second light receiving element having a second sensitivity characteristic and said at least one first light receiving element having a first sensitivity characteristic; said first sensitivity characteristic is greater than said second sensitivity characteristic, a resistance connected in series to said at least one first light receiving element, and a second means for switching to connect or disconnect said second light receiving element in parallel with said resistance and said first photoelectric element.

4. An electrical exposure control device as in claim 2, wherein said second light measuring circuit includes at least one second light receiving element; said first and second light receiving elements each respectively includes first and second photoelectric elements and said first photoelectric elements have a higher sensitivity characteristic than said second photoelectric elements, a resistance connected in series between said first photoelectric elements, a second means for switching connected across said resistance, a third means for switching connected between said second photoelectric elements, whereby with said first means for switching connected to said first measuring circuit, said second switch is closed and said third switch is open, and with said means for switching connected to said second light measuring circuit, said second switch is open and said third switch is closed.

5. An electrical exposure control device as in claim 2 further comprising:

an ammeter including said indicating member;
a power source connected in series to said ammeter;
said timing circuit includes a capacitor;
said first means for switching is controlled by said selecting member;

said means for switching connects and disconnects said second variable resistor to said capacitor and is ganged with said first means for switching whereby said second variable resistor is connected and disconnected respectively with said first means for switching connecting said second light measuring circuit and said first light measuring circuit; and said selecting member includes a rotatable multiple position switch comprising said means for switching said first variable resistor, one of said positions corresponds to said second exposure control and the remaining positions correspond to said first exposure control, whereby said first variable resistor is connected to said capacitor with said rotatable switch in said one position and said first and second light measuring circuits are respectively connected to said ammeter with the respective selection of said first and second exposure controls.

6. An electrical exposure control device as set forth in claim 1, further comprising:

a film sensitivity setting member;
means for adjusting the quantity of light incident on said light receiving element; and
means for controlling said adjusting means in response to the respective settings of said film sensitivity setting member and said selecting member.

7. An electrical exposure control device as in claim 1, wherein said means for varying the ratio includes a first resistor, a second resistor, and first switching means responsive to said selecting member selecting said second exposure control for establishing said first resistor in series with said at least one light receiving element and for establishing said second resistor in parallel with said first resistor and said at least one light receiving element.

8. An electrical exposure control device as in claim 1 wherein said means for varying the ratio includes a resistor, at least another light receiving element, and first and second switching means, said first and second switching means responsive to said selecting member selecting said second exposure control for establishing said resistor in series with said at least one light receiving element, and for establishing said at least another light receiving element in parallel with said at least one light receiving element and said resistor.

9. An electrical exposure control device as in claim 1 wherein said light receiving circuit includes two light receiving elements; and said means for varying the ratio includes a resistor connecting said two light receiving elements in series with each other; two additional light receiving elements, first switching means connectable across said resistor, and second switching means for establishing said two additional light receiving elements in series with each other and in parallel with said two light receiving elements and said resistor, whereby with said selecting member selecting said second exposure control said first switching means is open and said second switching means is closed.

* * * * *